A. N. HADLEY, DEC'D.
D. A. COX, ADMINISTRATOR.
CORN CUTTING AND SHOCKING MACHINE.
APPLICATION FILED JUNE 21, 1909.

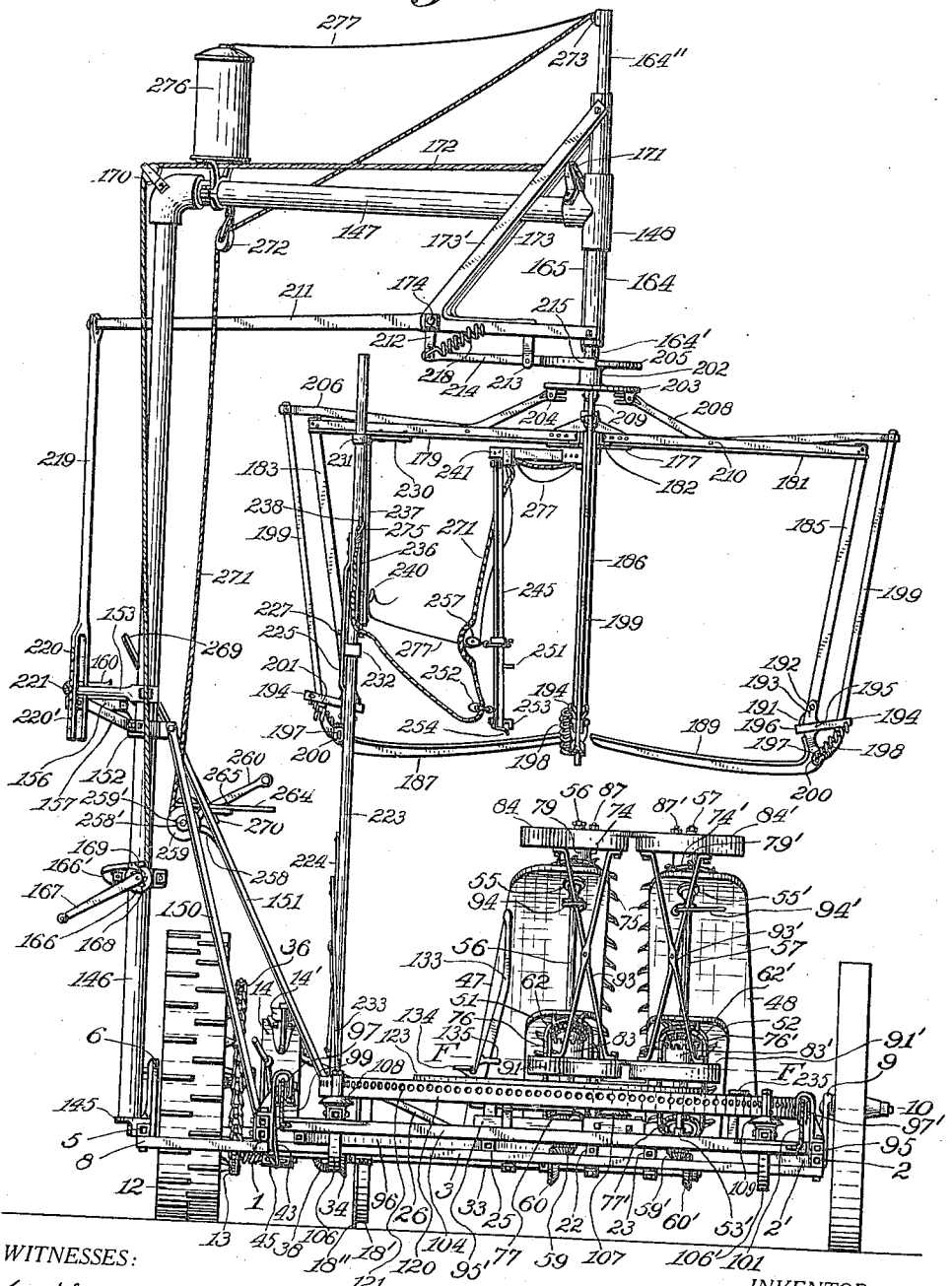

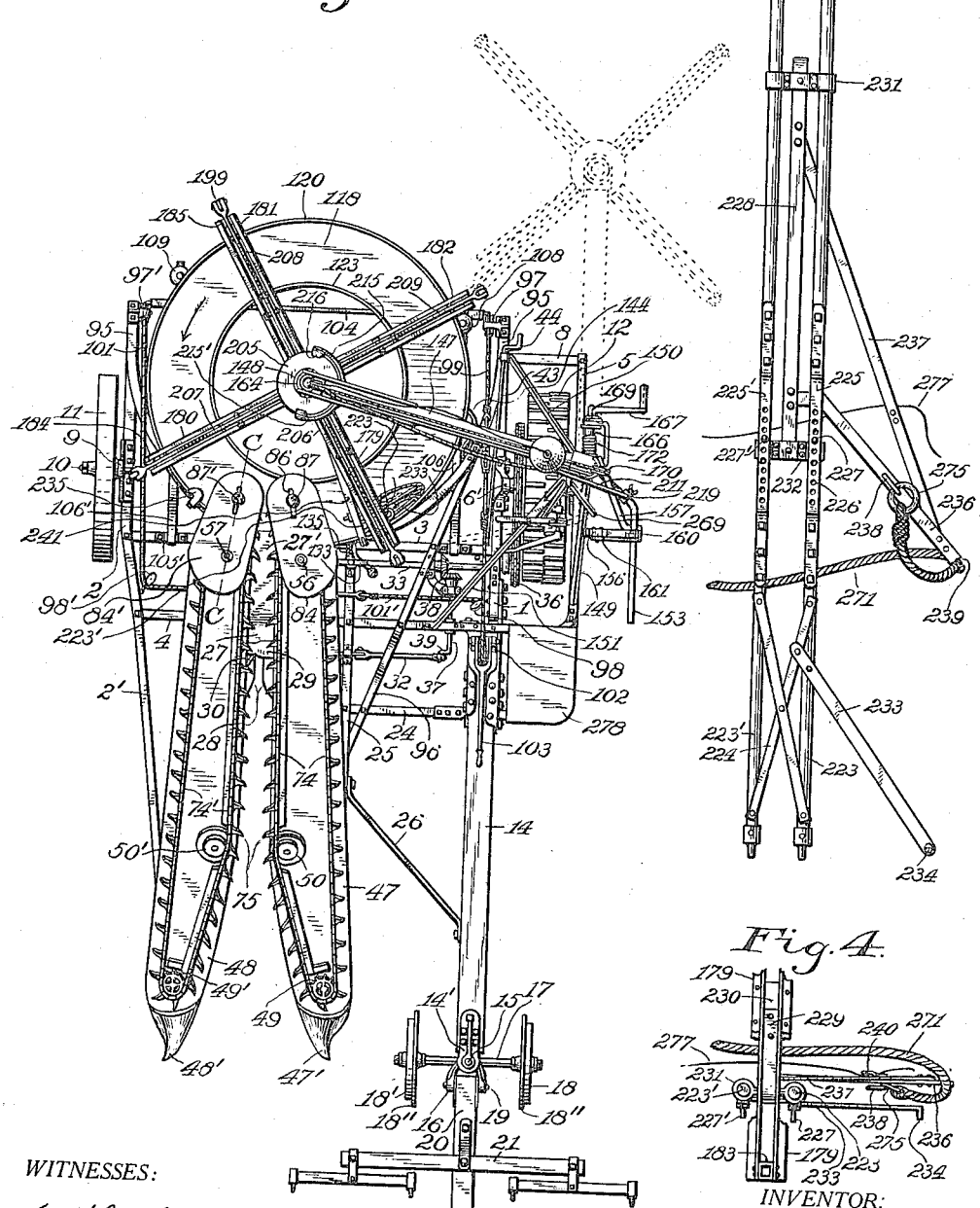

1,145,863.

Patented July 6, 1915.
10 SHEETS—SHEET 3.

WITNESSES:
J. H. Gardner
K. R. Woddell

INVENTOR:
Artemus N. Hadley,
BY
E. T. Silvius,
ATTORNEY.

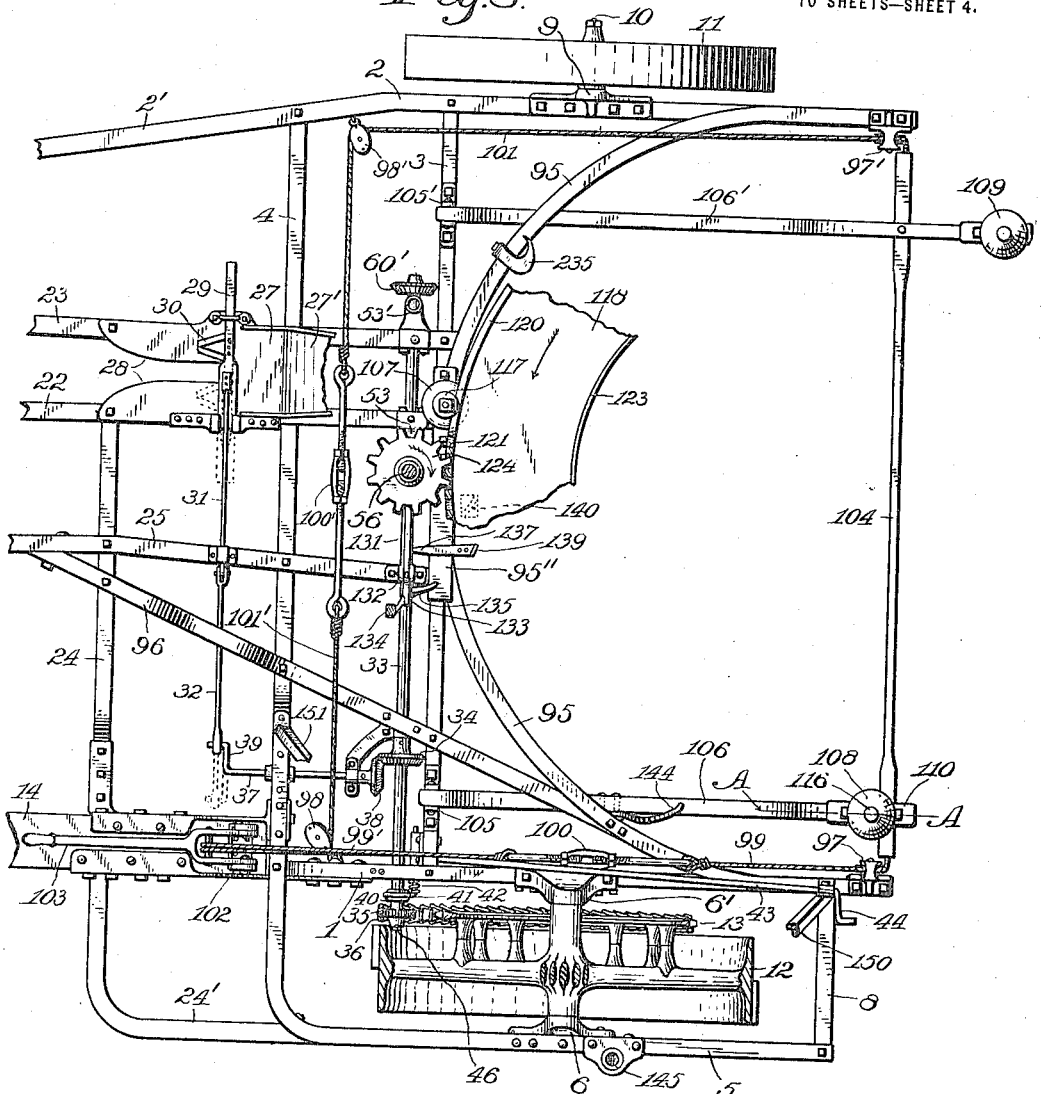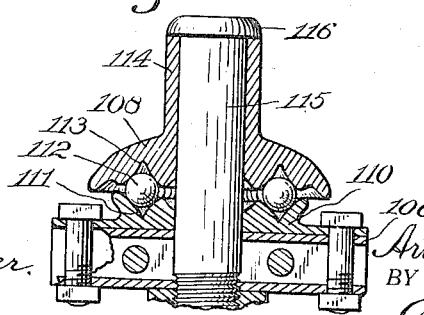

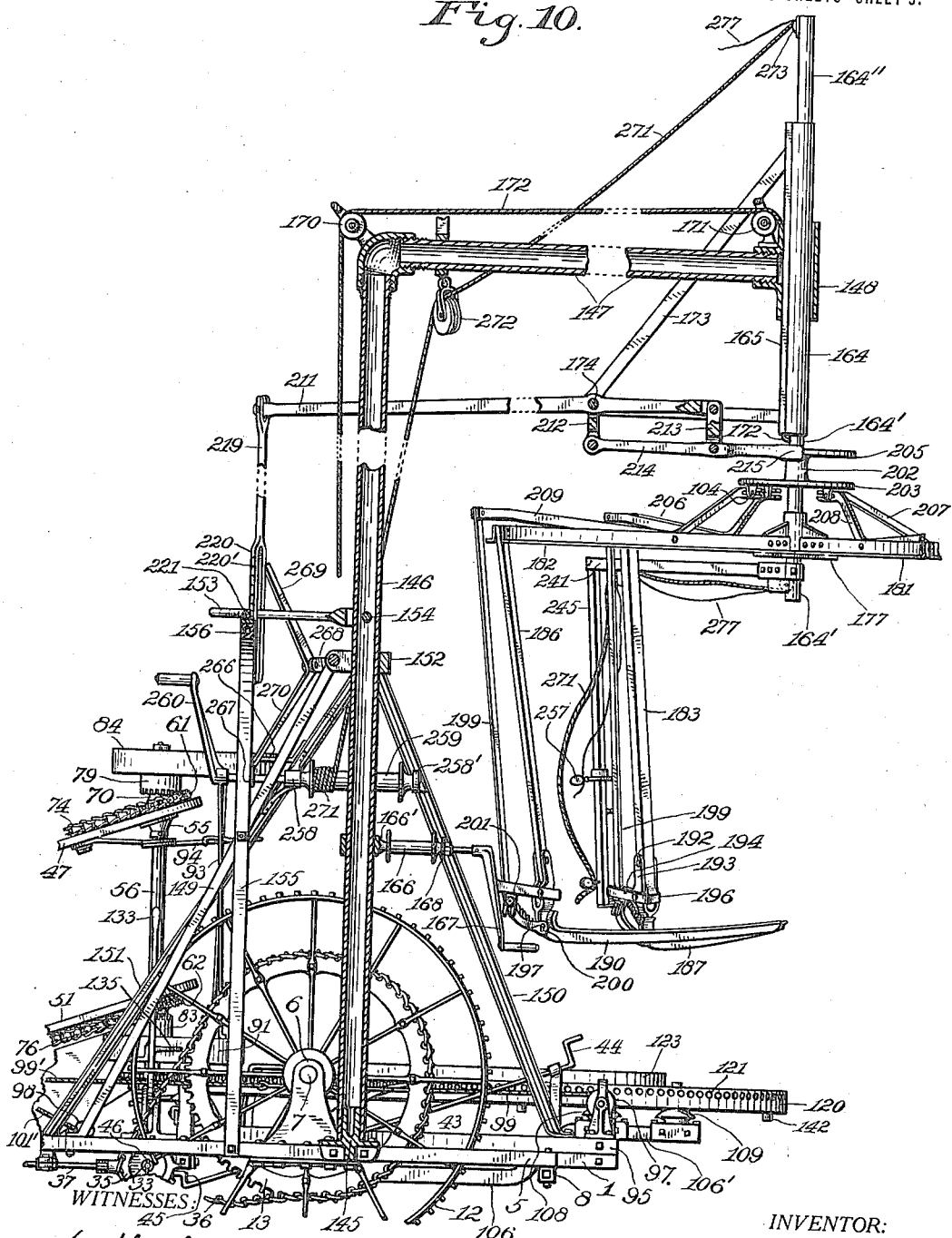

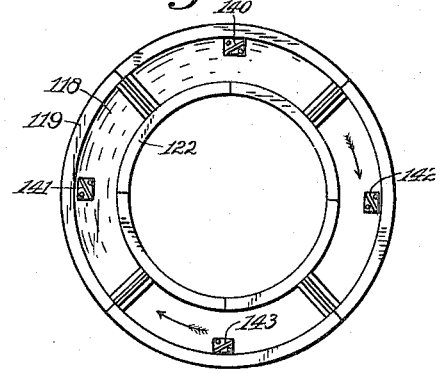
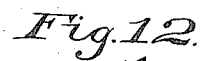
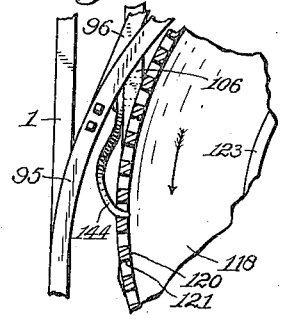
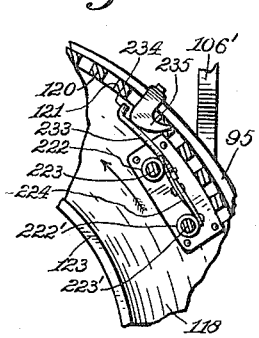
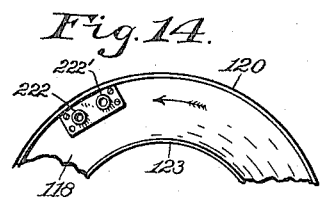
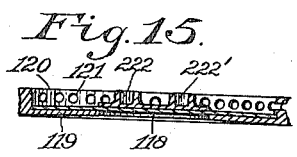
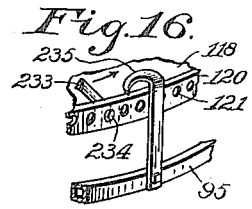
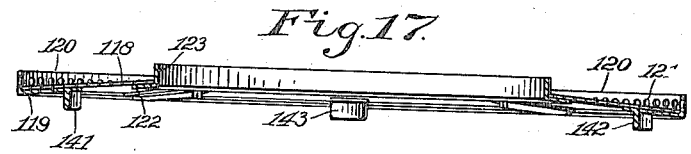
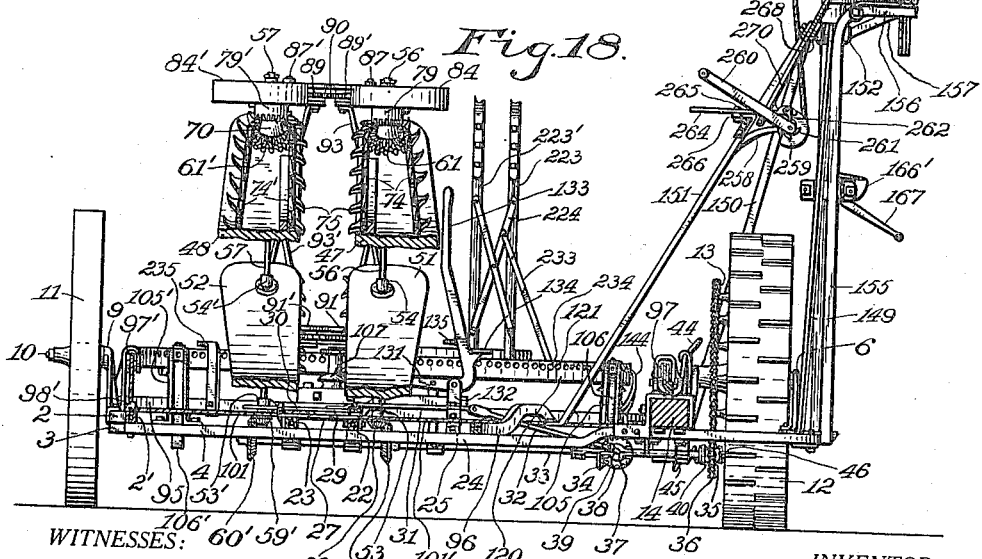

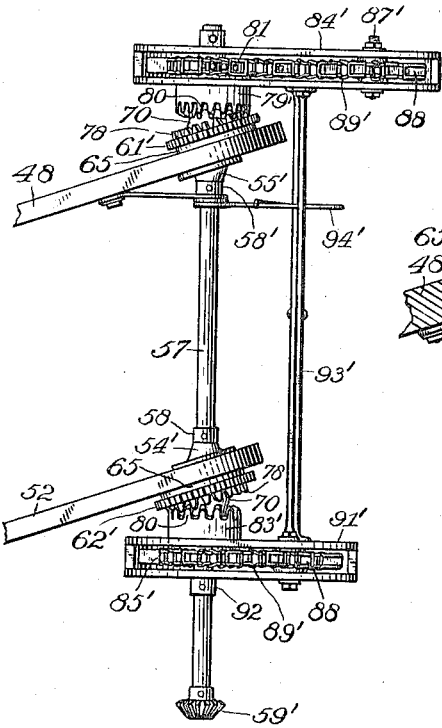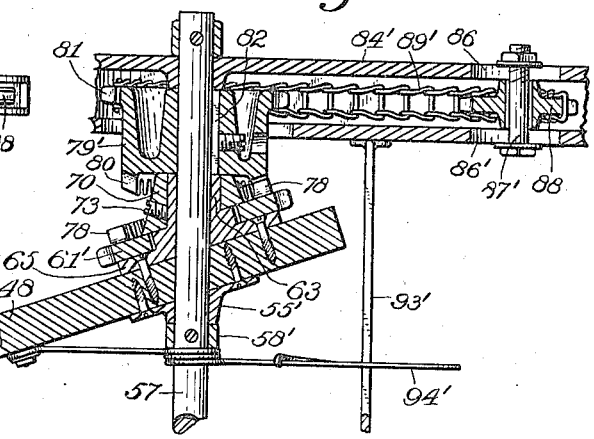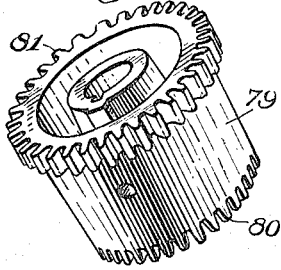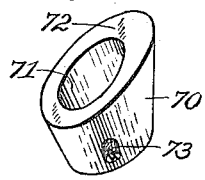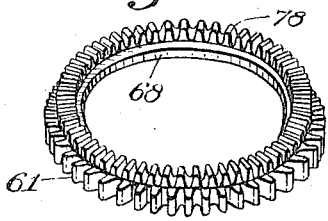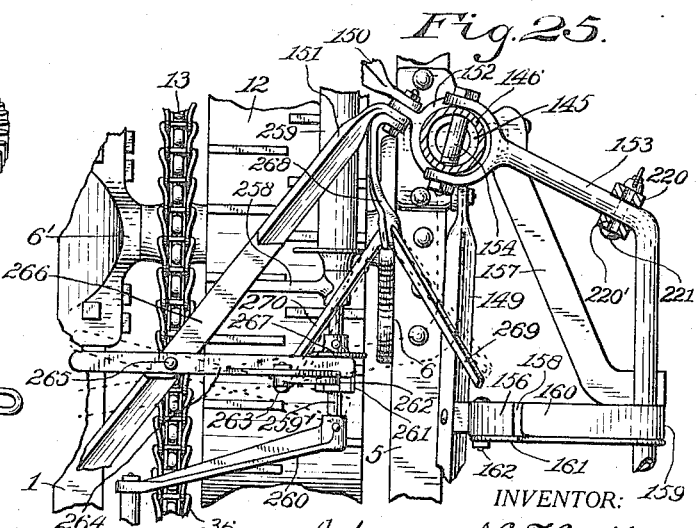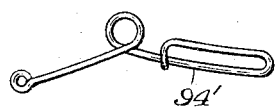

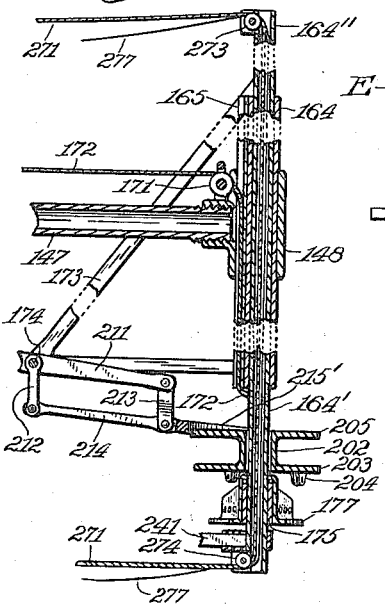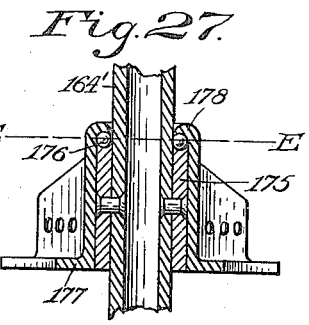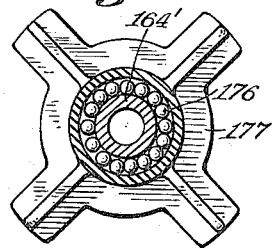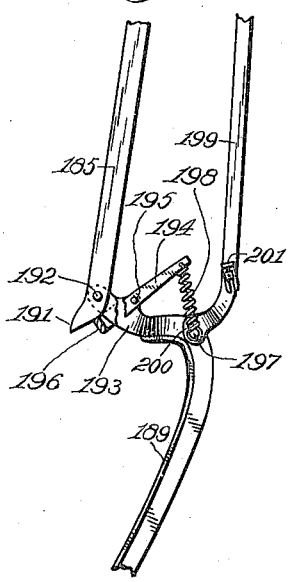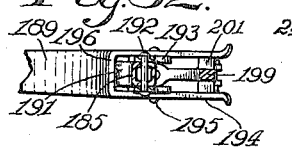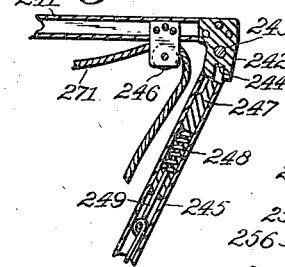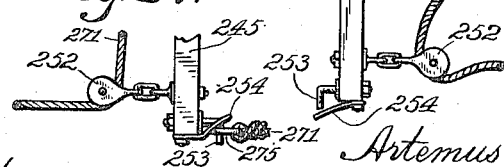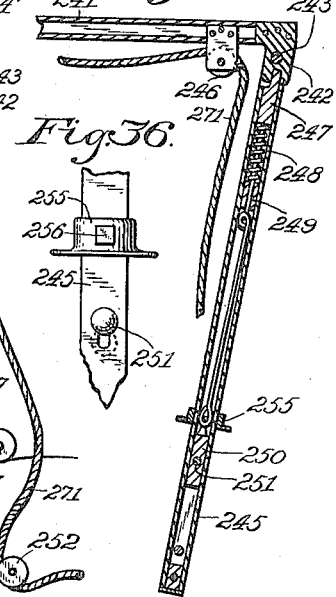

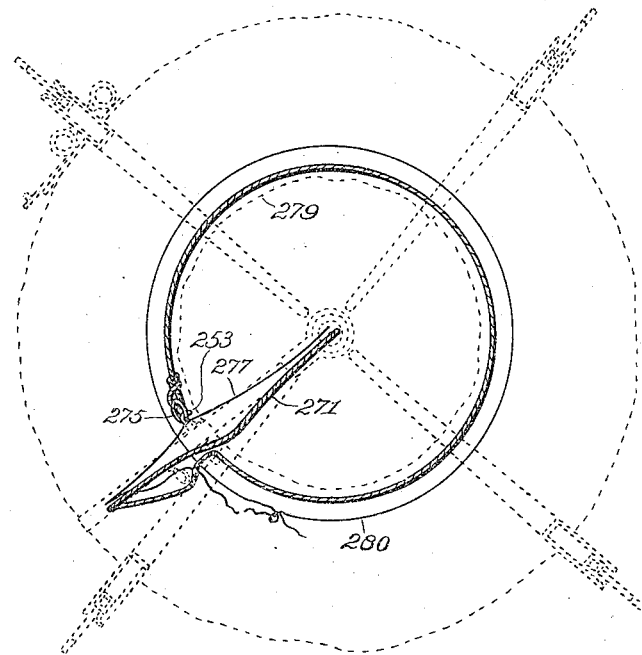
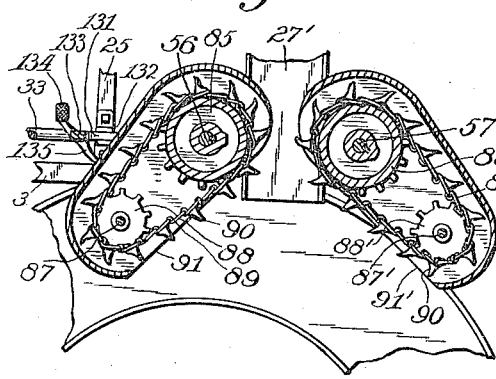
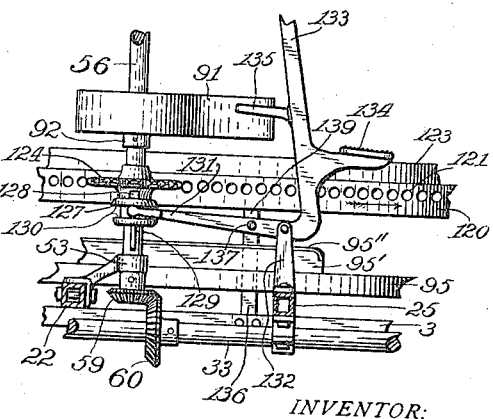

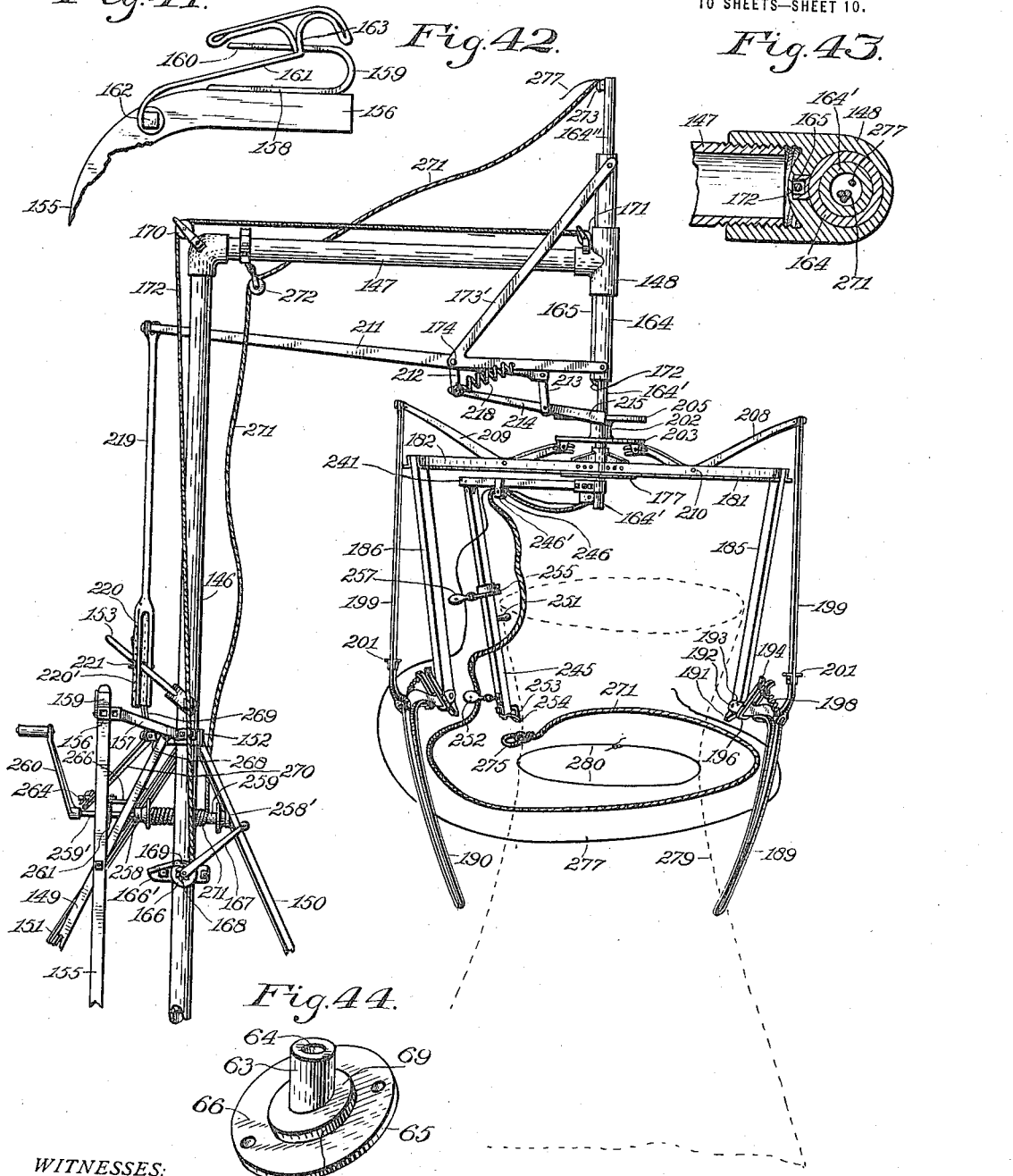

UNITED STATES PATENT OFFICE.

ARTEMUS N. HADLEY, OF INDIANAPOLIS, INDIANA; DUDLEY A. COX ADMINISTRATOR OF SAID HADLEY, DECEASED.

CORN CUTTING AND SHOCKING MACHINE.

1,145,863.          Specification of Letters Patent.        Patented July 6, 1915.

Application filed June 21, 1909. Serial No. 503,550.

*To all whom it may concern:*

Be it known that I, ARTEMUS N. HADLEY, a citizen of the United States, residing at Indianapolis, in the county of Marion and State of Indiana, have invented certain new and useful Improvements in Corn Cutting and Shocking Machines; and I do declare the following to be a full, clear, and exact description of the invention, reference being had to the accompanying drawings, and to the letters and figures of reference marked thereon, which form a part of this specification.

This invention relates to machines that are designed to be used for cutting off corn-stalks with the ear corn thereon and forming the corn-stalks into shocks and setting the shocks up in the field, the invention having reference more particulary to the shock forming and handling apparatus of such machines.

The object of the invention generally is to improve the construction of corn cutting and shocking machines, to the end that they may be constructed of relatively few parts and of light weight, so as to permit of easy operation of the machines on soft field ground, and be highly efficient, durable, and economical in use; specific objects being to provide improved shock forming apparatus whereby shocks may be conveniently formed with air spaces in them to afford desired ventilation; to provide relatively simple and efficient mechanism for guiding and feeding the corn-stalks and packing them in the shock-forming apparatus; and further, to provide improved and reliable means whereby parts of the shock-forming apparatus may be adapted to be employed in the operations of depositing the shocks onto the ground.

The invention consists in novel application of improved oblique-angled transmission gearing; in an improved table on which to form the shocks, and in supports for the table; in novel combined guides and supports employed in forming and carrying the shocks, and in improvements in apparatus for compressing the shocks preparatory to binding them.

The invention consists further in the novel parts, and in the combinations and arrangements of parts, as hereinafter particularly described and then defined in the accompanying claims.

The improved oblique-angled gearing, herein described but not separately claimed, forms the subject-matter of a divisional application for Letters Patent, filed June 20, 1910, Serial Number 567,757.

Referring to the drawings, Figure 1 is a rear elevation of a corn cutting and shocking machine constructed substantially in accordance with the invention; Fig. 2, a top plan of the machine; Fig. 3, an elevation of a novel form of standard comprised in the invention; Fig. 4, a fragmentary plan view showing parts of Fig. 2 on an enlarged scale; Fig. 5, a fragmentary vertical sectional elevation of parts of the machine looking rearward; Fig. 6, a fragmentary vertical sectional elevation of the parts looking from the left to the right hand side of the machine; Fig. 7, a side elevation of the machine; Fig. 8, a fragmentary horizontal section approximately at the plane of the axis of the main or driving-wheel; Fig. 9, a fragmentary vertical section on the line A A in Fig. 8; Fig. 10, a fragmentary vertical sectional elevation with parts of the apparatus in different positions from those shown in the preceding figures; Fig. 11, an inverted plan of the improved turn-table; Figs. 12, 13, 14, 15 and 16, fragmentary details of the turn-table and parts of the machine associated therewith; Fig. 17, a vertical central sectional view of the turn-table; Fig. 18, a fragmentary vertical section of the machine approximately at the plane of the line B B in Fig. 7; Fig. 19, an elevation of parts of the guiding and feeding apparatus showing the improved oblique-angled gearing therefor as preferably constructed; Fig. 20, a fragmentary vertical section of parts shown in the preceding figure as on the line C C in Fig. 2; Figs. 21, 22, and 23, perspective views of different parts of the oblique-angled gearing; Fig. 24, a top plan of one of the springs for the packers; Fig. 25, a fragmentary horzontal sectional plan showing parts on an enlarged scale that are partly obscure in Fig. 2 as at the plane of the line D D in Fig. 18; Fig. 26, a fragmentary vertical sectional view of parts that are supported by the mast for carrying the shocks; Fig. 27, a fragmentary vertical section reproducing parts of Fig. 26 on an enlarged scale; Fig. 28, a fragmentary perspective view of one of the devices for controlling the combined guide and supporting fingers or spurs that carry the shocks; Fig. 29, a horizontal sectional view approximately on the line E E in Fig. 27; Fig. 30, a perspective view of one of the parts for controlling the fingers; Fig. 31, a fragmentary elevation of one of the fingers and its supporting arm and devices for latching and controlling a finger or spur; Fig. 32, a fragmentary horizontal section of the parts shown in the preceding figure; Fig. 33, a fragmentary vertical section of the arm for guiding the compression-rope of the machine; Fig. 34, an elevation of the guide arm; Fig. 35, a vertical section of the guide arm; Fig. 36, a fragmentary detail of one portion of the guide arm; Fig. 37, a fragmentary detail of another portion of the guide arm; Fig. 38, a diagrammatic plan view partially in broken lines illustrating the manner of using the compression-rope and binding the shock; Fig. 39, a fragmentary horizontal section on the line F F in Fig. 1; Fig. 40 a fragmentary sectional elevation looking rearward and showing the turn-table connected with the driving shaft of the machine; Fig. 41, a fragmentary elevation showing a latch for holding the shock carrier against movement; Fig. 42, a fragmentary elevation illustrating the manner of releasing a shock after having carried it from the turn-table; Fig. 43, a fragmentary horizontal section through the guide head of the arm of the mast for carrying the shocks; and Fig. 44 a perspective view of one of the parts of the oblique-angled gearing.

Similar reference characters in the different figures of the drawings indicate corresponding elements or features of construction referred to herein.

In the construction of the machine the light-weight and relatively strong forms of structural iron are employed wherever they are suitable, such as hollow bars that are square in cross-section, tubes, angle-iron and channel-iron, the main frame comprising two parallel side bars 1 and 2, the latter having a forwardly projecting angular extension 2' thereon, a transverse beam 3 attached to the side-bars 1 and 2 at a suitable distance forward of the rear ends thereof, a transverse bar or beam 4 attached to the extension 2' and also to the side-bar 1 and extending outward beyond the latter and rearward parallel to the side-bar 1 and forming an outer side bar 5. A pair of hangers 6 and 6' are attached to the side-bars 5 and 1 respectively, and have an axle 7 connected thereto, and a tie-bar 8 is attached to the side-bars 1 and 5 near the rear ends thereof.

A hanger 9 is connected to the side-bar 2 and has an axle 10 thereon on which a carrying wheel 11 is mounted rotatably, a main or drive wheel 12 being mounted on the axle 7 and having a sprocket-wheel 13 mounted thereon for driving the cutting apparatus and other operating mechanism of the machine.

A coupling pole or beam 14 is attached rigidly to the side-bar 1 and the transverse beam 4 and extends forward as a part of the main frame and has a pivot-iron 14' attached to its end. A bolster 15 is provided with a vertical pivot 15' that is mounted to rotate in the pivot-iron, the pivot having a jaw 16 secured thereto, an axle 17 being attached to the bolster and having guide-wheels 18 and 18' thereon, each wheel having a flange 18'' on its rim adapted to cut into the ground and prevent the wheels from skidding side-wise. The jaw 16 has a horizontal pivot or hinge-rod 19 to which is connected a pole or tongue 20 provided with a draft appliance 21 for drawing and guiding the machine.

Two longitudinal beams 22 and 23 are attached to the transverse beams 3 and 4 and extend forward a suitable distance, being parts of the main frame, and a transverse frame beam 24 is attached to the beam 22 and also to the pole 14 and extends outward and rearward to the outer frame-bar 5 to which it is attached and forming an extension 24' thereof. A longitudinal beam 25 is attached also to the beams 3 and 4 and to the beam 24 and extends forward a suitable distance, a diagonal brace 26 being attached thereto and also to the coupling-pole 14. A guide-plate 27 is mounted on the beams 22 and 23 and has a guide-slot 28 in the forward end thereof to guide the corn-stalks to the cutter, the plate 27 having an inclined guide-plate 27' thereon extending rearward a suitable distance. A cutter-bar 29 is mounted upon the plate 27 so as to reciprocate and has a cutting knife 30 attached thereto to be moved across the guide-slot, the cutter-bar having an operating rod 31 attached thereto to which is connected a pitman 32.

A driving shaft 33 is mounted in suitable journal boxes on the side-bar 1 and the longitudinal bars or beams 22, 23 and 25, near the bar or beam 3 and has a bevel gear wheel 34 secured thereto, the shaft having a sprocket wheel 35 thereon to which is connected a sprocket chain 36 that is connected to the sprocket wheel 13, for driving the shaft.

A shaft 37 is suitably supported rotatably on the frame longitudinally of the machine and has a beveled gear wheel 38 secured thereto that is in engagement with the wheel 34, the shaft 37 having a crank 39 thereon which is connected with the pitman 32, whereby to operate the cutting-knife.

Suitable provision is made for throwing the shaft 33 out of gear and may be variously constructed, the sprocket-wheel 35 preferably having an extended hub 40 suitably engaged by a fork 41 provided with a spring 42 to move the sprocket wheel in one direction along the shaft 33, the wheel 35 being adapted to rotate on the shaft, a rock-shaft 43 being suitably mounted on the frame and provided with an operating handle 44, and an arm 45 suitably connected with the fork 41 for moving it and the sprocket wheel 35 in the opposite direction or away from a pin 46 secured in the shaft 33, the outer end of the hub of the wheel 35 being adapted to engage the pin as a clutch when pressed into engagement therewith by the spring 42.

A pair of inclined guides 47 and 48 having pointed shoes 47' and 48' respectively, are suitably mounted on the forward parts of the main frame, and have guide wheels 49 and 49' mounted on the forward ends thereof, other guide-wheels 50 and 50' preferably being mounted also on the guides, the guides 47 and 48 being adapted to guide the corn-stalks to and beyond the cutting-knife and to assist in guiding the feed-belt. A pair of inclined guides 51 and 52 are suitably mounted on the frame below the guides 47 and 48, for assisting in guiding the corn stalks. A pair of journal boxes 53 and 53' are mounted on the beams 22 and 23 respectively, above the shaft 33. The tops of the guides 51 and 52 preferably are provided with journal boxes 54 and 54', and the under sides of the guides 47 and 48 with similar boxes 55 and 55' in which to journal vertical shafts, the boxes being adapted to the inclination of the guides. A pair of vertical shafts 56 and 57 are mounted rotatably in the boxes and extend through the guides, each shaft having a collar 58 secured thereto that has a bearing on the top of the box that is mounted on the lower guide, each shaft preferably having also a collar 58' secured thereto and against the under side of the box that is secured to the under side of the upper guide. The shafts 56 and 57 are provided at their lower ends with bevel gear-wheels 59 and 59' respectively, that are in engagement with bevel gear-wheels 60 and 60' respectively, which are secured to the shaft 33 for rotating the vertical shafts, each vertical shaft having the improved oblique-angled gearing connected thereto for driving feed belts that operate on the inclined guides, the shafts also driving horizontally arranged belts for feeding and packing the stalks to the shock forming apparatus. Each oblique-angled gearing in its preferred form of construction comprises an annular sprocket-wheel 61 or 61' for the upper inclined guide feeders, or similar wheels 62 or 62' for the lower inclined guide feeders, each sprocket-wheel being mounted on a guiding base comprising a cylindrical part 63 having a bore 64 receiving the driving shaft rotatably, the base having a flange 65 that has a bearing face 66 which is inclined to the axis of the shaft, so as to correspond to the plane of the guide, as 48, the flange 65 having a boss projecting from the guide face 66 so as to form a cylindrical guide 67 whose axis is at right angles to the plane of the bearing face 66 on which the sprocket wheel is partially guided, the inner side of each sprocket-wheel having a guiding face 68 disposed against the cylindrical guide 67. The end of the cylindrical guide 67 has a guide face 69 that is parallel to the guide face 66. A collar 70 has an opening 71 that is fitted over the cylindrical part 63, and has also an oblique-angled face 72 that rests on the bearing-face 69 and extends beyond the same, as a guide for the sprocket-wheel, the collar being secured to the cylindrical part by a set-screw 73, or otherwise as may be desired. A feed-belt 74 is driven by the sprocket-wheel 61 and guided by the guide-wheels 49 and 50 on the guide 47, a similar feed belt 74' being driven by the sprocket-wheel 61' and guided by the wheels 49' and 50' on the guide 48, the feed belts being suitably formed as sprocket-chains and provided with fingers 75 for feeding the corn-stalks to the cutting-knife, or holding the stalks upright while the machine moves forward, as will be understood. Similar feed-belts 76 and 76' are driven by the lower sprocket wheels 62 and 62' beneath the guides 52 and 52' and are guided by guide wheels 77 and 77' mounted under the guides 52 and 52', for assisting the upper feed-belts or feeding short stalks. In order to drive the feed-belts in the angles in which they are arranged, each sprocket wheel, as 61, has gear-teeth 78 on one side thereof, and a gear-wheel, as 79 or 79', is mounted on the shaft 56 or 57 against the collar 70, and the cylindrical part 63 and has gear teeth 80 projecting from the end thereof into engagement with the gear-teeth 78 of the sprocket-wheel, the gear-wheel 79 having also sprocket teeth 81 on its periphery, and is secured to its shaft by a key 82 or otherwise as may be desired. Gear wheels 83 and 83', similar to the wheels 79, are secured also to the vertical shafts and are in engagement with the gear teeth of the sprocket-wheels 62 and 62' for driving the lower feed belts.

A pair of hollow guides 84 and 84' are mounted rotatably on the shafts 56 and 57 respectively, and extend rearward, being supported on the upper ends of the gear-wheels 79 and 79'. The gear wheels 83 and 83' have sprocket wheels 85 and 85' thereon. The tops and bottoms of the hollow guides 84 and 84' have slots 86 and 86' in which axles 87 or 87' are adjustably secured, and on each of which a guide-wheel 88 or 88' is rotatably mounted. Feed-belts 89 and 89' are mounted in the hollow guides on the sprocket-wheels and guide-wheels therein, the arrangement being such that the hollow guides inclose the sprocket-wheels, as 81. The feed belts have fingers 90 thereon for feeding the stalks and packing them into the shock forming apparatus. Similar hollow guides 91 and 91' are mounted also on the vertical shafts, so as to inclose the sprocket-wheels 85 and 85', and feed belts are arranged in the guides as above described, the guides being supported on collars 92 secured to the shafts. The upper and lower horizontally swinging hollow guides are preferably connected together by X-braces 93 and 93', so that they swing in unison, and the opposing guides are normally spring-pressed together by suitable springs 94 and 94' secured to the inclined guides and wound about the vertical shafts and engaging the X-braces.

A curved frame member 95 has its ends secured to the rear ends of the side bars 1 and 2 and its middle portion secured on the longitudinal bars 22 and 25 above the transverse beam 3, and has a spacing-block 95' thereon, preferably covered by a metal plate 95''. Preferably a diagonal brace 96 is secured to the member 95 near the side-bar 1 and extends forward and is secured to the longitudinal bar 25, being secured also to the beams 3, 4 and 24, for stiffening the main frame. A pair of guide sheaves or pulleys 97 and 97' are suitably mounted on the rear ends of the main frame bars, as at the ends of the member 95. A pulley block 98 is connected to the side bar 1 and a similar pulley block 98' is connected to the side-bar 2 or its extension 2'. A lifting cable 99 extends over the guide pulley 97 and has a turn-buckle 100 connected thereto to which is connected a cable 99' that extends forward near the side-bar 1. A cable 101 extends over the guide pulley 97' and through the pulley-block 98' and has a turn-buckle 100' connected thereto to which is connected a cable 101' which extends through the pulley-block 98 and thence forward. A pivot stand 102 is mounted on the rear end of the coupling-pole or beam 14 and has a lever 103 pivoted thereto to which the cables 99' and 100' are connected. A beam 104 comprising a part of a drop frame is connected to and supported by the ends of the cables 99 and 101 and may be raised or lowered by movement of the lever 103, the beam being in its raised position when the lever lies prone on the beam 14, and may be lowered by swinging the lever upward and rearward. Two pivot stands 105 and 105' are mounted on the beam 3 at suitable distances apart, and beams 106 and 106' have their forward ends pivoted thereto respectively, and their other end portions secured on the top of the beam 104, the beam 106' preferably extending rearward somewhat beyond the beam 104.

Three suitable roller bearings are provided for supporting a rotary table or turntable on which to form the shocks, there being a bearing 107 mounted on the plate 95'', another bearing 108 mounted on the beam 106 and a similar bearing 109 mounted on the rear end of the beam 106', the three bearings being arranged as at the angles of a triangle and approximately equally distant apart. Each bearing as 108 is crowning on its top and is supported on a base plate 110 suitably secured fixedly, the top of the plate having an annular V-shaped groove 111 therein in which are bearing-balls 112 supporting the bearing 108 in the under side of which is an annular V-shaped groove 113 receiving the balls. The bearing has an upward extending cylindrical part 114 and is guided against accidental displacement from the bearing-balls by a post 115 having a flange 116 and secured to the beam 106 or other member supporting the base-plate. The bearing 107 preferably has a flange or collar 117 at the top of the cylindrical part of the bearing and extending laterally beyond the periphery of the cylindrical part. The turn-table comprises an annular plate 118 which is preferably composed of sections of sheet-metal plates and it is formed so as to be conical or crowning, the outer edge of the plate having a rim thereon formed of L-section angle-iron of which one flange 119 extends under the annular plate, its other flange 120 extending upward from the plate and having apertures 121 therein spaced suitable distances apart to receive the teeth of a gear wheel or pinion for turning the table, the flange 120 serving to prevent the corn-stalks from slipping off of the plate. The inner edge of the plate has a ring secured thereto that is formed of L-section angle-iron, one flange 122 of which extends under the plate and the other flange 123 extending upward beyond the plate 118 to prevent the stalks from being pushed in toward the axis of the turn-table, the object being to form a shock having a relatively broad base with a central ventilating air space therein. The flange 119 forms a guide that runs on the crowning portions of the roller bearings, and the other flange 120 is guided against the cylindrical parts 114 of the bearings, so that as will be seen the table may be relatively large while much of the expense and weight incidental to a center-bearing table of equally great diameter is eliminated. A gear wheel 124 is mounted rotatably on the vertical shaft 56 and is supported by a collar 125 that is secured to the shaft, the teeth of the wheel entering the apertures 121 for turning the table. The under side of the gear wheel has notches 126 therein, and a sleeve 127 is mounted on the shaft 56 and has projections 128 adapted to be moved into the notches so as to clutch the gear wheel for driving it, the sleeve being prevented from turning on the shaft by a spline 129 permitting the sleeve to move along the shaft. The sleeve has a groove 130 therein into which extends a forked arm 131 for controlling the sleeve, the arm being pivoted to a stand 132 secured to the beam 25 and having a lever 133 formed thereon that leans toward the shaft 56, so that the force of gravity acting through the lever and the arm and also the sleeve normally holds the sleeve away from the gear-wheel 124. The lever 133 has an arm 134 thereon adapted to be pressed down by a foot of the attendant of the machine, and the lever has also another lateral arm 135 adapted to be engaged by the hollow guide 91 when it swings around after a section of the turn-table is filled with stalks. The lever 133 may be moved also by hand, as is apparent, and when moved in the direction away from the shaft 56 it will be seen that the clutch sleeve 127 will enable the shaft to turn the gear-wheel 124, which obviously will turn the table while the machine is moving on the ground until the lever is released so as to release the gear-wheel from the shaft.

A spring arm 136 is secured to the beam 3 and extends upward past the rear side of the member 95, nearly to the under side of the turn-table, and has a latch-bar 137 attached thereto that is adapted to enter an aperture 138 in the arm 131, for temporarily holding the clutch sleeve 127 in engagement with the gear wheel 124, the latch-bar having an upturned finger 139 thereon which is adapted to be engaged by either one of a plurality of angle-plates 140, 141, 142, 143, secured to the under side of the turn-table and adapted to withdraw the latch-bar 137 from the aperture 138, at the proper time to bring a section of the turn-table in proper position to receive the corn-stalks, after one or more sections have been filled.

A pawl-shaped spring-catch 144 is secured to the beam 106 and drags against the flange 120 when the turn-table moves, and prevents accidental movement of the turn-table by entering one of the apertures in the flange, the spring-catch being forced out of the apertures when the turn-table is forcibly turned forward, and it also prevents the table from being moved backward.

A step bearing 145 is mounted on the side-bar 5 of the main-frame and rotatably supports a crane mast 146 having a lateral arm 147 thereon, on the end of which is a vertical hollow guide-head 148. The main frame has a tripod stand mounted thereon comprising legs 149, 150 and 151, converging upwardly to a guide collar 152 to which they are attached, and the mast extends through the collar and is guided thereby and maintained in vertical position. A lever 153 has a forked end that is connected to the mast by a pivot 154 for rotating the mast and also for latching it against rotation, and for other purposes which will hereinafter appear. A standard 155 is attached to the side bar 5 and also to the leg 149 and extends upward a suitable distance and has a lateral arm 156 formed thereon, the arm having a brace 157 attached thereto which is attached also to the collar 152. The arm 156 has a stop and latch for the lever 153 mounted thereon, the stop preferably comprising a plate 158 secured to the arm and bent over to form a stop loop 159 from which extends a guide finger 160 to prevent the lever from being accidentally moved upward pivotally, the lever normally being in contact with the loop 159 when the mast is turned so that the guide-head 148 is in alinement with the axis of the turn-table. The latch preferably comprises an arm 161 that is connected at one end by a pivot bolt 162 to one side of the arm 156, the other end of the arm being formed so as to provide a curved shoulder 163 adapted to rest upon the lever 153 and also against it to hold it against the loop 159, so that when the arm 161 is thrown over away from the lever the latter may be freely moved around and beyond the end of the finger 160 to swing the arm of the mast.

A hollow guide 164 is mounted vertically in the guide-head 148, and is preferably formed of a piece of tubing of suitable length, and has end portions 164' and 164" that are less in diameter than the middle or body portion of the guide, being preferably formed of a tube inserted in the main or body portion of the guide, the latter having a section of channel iron 165 on its outer side and extending longitudinally thereof with the back of the channel iron against the guide, the guide-head 148 being suitably recessed to permit the passage of the channel iron. A winding drum 166 is mounted on a bracket 166' that is secured to the mast and is provided with a crank-arm 167, and a ratchet-wheel 168 which is engaged by a pawl 169. A guide sheave or pulley 170 is mounted on the top of the mast and a similar pulley 171 is mounted at the top of the guide-head 148. A cable 172 is connected to the winding drum and extends over the pulleys 170 and 171 and down through the guide-head 148, between the flanges of the channel iron 165, and is suitably secured to the lower end of the main part of the guide 164 for raising or lowering the guide, as may be required when cutting tall or short corn-stalks. A pair of brackets 173 and 173' are secured to the upper portion of the guide 164 and extend obliquely at opposite sides of the arm 147 toward the mast a suitable distance and then backward to the lower end of the main part of the guide 164, to which they are secured, the brackets having a pivot 174 mounted therein. A collar 175 is secured on the lower end portion 164' of the vertical guide 164 and has bearing balls 176 on the top thereof, a hub 177 being mounted rotatably on the collar and having an internal flange 178 on the top thereof that has its bearing upon the bearing balls for supporting the hub. A plurality of arms 179, 180, 181, 182, are secured rigidly to the hub and extend radially to the axis thereof, the arms being preferably formed each of two bars of L-section angle-iron, or otherwise as may be desired, the arms having downward extending parts 183, 184, 185, 186, respectively, which parts preferably extend inward toward the axis of the hub. The lower ends of the downward extending portions of the arms have fingers or spurs 187, 188, 189, 190, thereon respectively, and are each provided also with an inwardly extending projection 191 on its lower end, above which is a pivot 192 (more clearly seen in Fig. 31). Each finger, as 189, has a relatively short lateral arm having a jaw 193 formed on its end which is connected to the pivot 192, and a latch lever 194 is connected to the jaw by a pivot 195 and has a loop 196 thereon adapted to engage the projection 191 when the finger swings to a position approximately horizontal, or nearly at right angles to the part 185 of the supporting arm of the finger. The finger has a pivot 197 to which a coil-spring 198 is connected, the spring being connected also to the latch lever 194 for normally forcing the loop 196 into engagement with the projection 191. Each finger is provided with a connecting rod 199 for swinging the finger upward to normal position, the lower end of the rod being bifurcated and having slots 200 therein receiving the pivot 197, so that when the rod 199 is pushed downward the finger will be forced to its normal position, and the loop 196 will be forced into engagement with the projection 191 and hold the finger. The rods 199 have lugs 201 mounted adjustably thereon that are adapted to be engaged by the latch lever 194 when the finger is latched, and it will be apparent that the slots in the end of the rod 199 will permit the rod to be moved upward slightly, so that the lugs will force the lever 194 upward, or so as to withdraw the loop 196 from the projection 191 and permit the finger to swing downward on its pivot. A sleeve 202 is mounted on the vertical guide part 164', so as to be rotatable and also movable vertically thereon, and has a flange 203 on the lower end thereof provided on its under side with ears 204, the upper end of the sleeve having a flange 205 thereon for controlling the vertical movement of the sleeve. Levers 206, 207, 208, 209, are mounted on the horizontal portions of the arms that are attached to the hub 177, each lever being connected between its ends to the arm by a pivot 210 and having its outer end pivoted to the respective one of the rods 199, the inner ends of the levers being suitably connected with the ears 204, so as to enable the collar 202 to move the levers upward or downward, and thereby force the fingers up to normal positions, or trip the latch levers for releasing the fingers and permit them to swing downward and outward in order to release the fingers from the shocks of corn.

A lever 211 is mounted between its ends on the pivot 174, and a link 212 is connected also to said pivot, another link 213 being pivotally connected to the lever 211 so as to hang near to the flange 205 of the operating sleeve 202. A bar 214 is pivotally connected and supported on the two links and has a fork comprising two curved arms 215 and 215' that extend to opposite portions of the periphery of the flange 205, one arm having projections 216 and 216' to engage the top and bottom of the flange respectively, and the other arm having similar projections 217 and 217' to engage the top and bottom of the flange respectively, for moving and controlling the sleeve vertically and permitting rotation of the sleeve. A spring 218 is connected to one of the pair of brackets and also to the lower end of the link 212 in such manner as to constantly draw the bar 214 toward the flange 205 with the bases of the arms of the fork in contact with the flange, so that during movements of the lever 211 pivotally the projections on the arms of the fork will not move away from their proper positions with respect to the flange, the object being to keep the sleeve in balance when being lifted to prevent unnecessary friction between it and its guide. An operating rod 219 is pivoted to the lever 211 and extends downward, and has a bifurcated lower end 220 having pivot holes 220' therein to receive a pivot-bolt 221, whereby the end is pivotally connected to the lever 153, so that the lever 211 may be operated automatically when the lever 153 is operated pivotally.

In order to insure movement of the fingers about the axis of rotation of the turn-table on rotary movement of the turn-table, the top of the turn-table is provided with a pair of sockets 222 and 222' that are arranged close to the flange 120. A standard is provided comprising two rods 223, and 223' that normally stand upright in the sockets and are removable therefrom, the rods being connected together by an X-brace 224 and have guide-bars 225 and 225' attached thereto respectively, the guide-bars having pin-holes 226 therein into which are inserted a pair of pins 227, 227', for supporting the standard when disconnected from the turn-table. A frame-bar 228 extends vertically between the rods and has its upper end turned over and forming a supporting arm 229 which is secured to a plate 230 that is attached to the arm 179, so that the arm 179 supports the frame bar 228, the latter being provided with a guide 231, through which the rods 223 and 223' may move vertically and be guided thereby, and whereby the arm 179 may be moved. The lower end of the frame-bar 228 has a cross-bar 232 attached thereto that extends between the rods 223 and 223' and the guide-bars 225 and 225' and also extends around the rods as guides therefor, the arrangement being such that the standard may rise and may descend until stopped by the pins 227, 227', engaging the top of the cross-bar 232. A brace 233 is secured to the standard and extends downward at an inclined angle, and forward with respect to the direction of movement of the turn-table, and has a projection 234 on the outer side of its lower end which is inserted in one of the apertures 121 in the flange 120 of the turn-table, so as to prevent the upper end of the standard from being forced backward during operations of the turn-table.

A wedge-like disconnector 235 is secured rigidly to the frame member 95 and extends over the top of the flange 120 so as to be engaged by the brace 233 when carried thereto by the turn-table, to automatically force the projection 234 out of the aperture in the flange to permit the turn-table to be lowered away from the standard and leave the standard hanging on the arm 179.

An arm 236 is secured to the frame-bar 228 to which is attached a brace 237 which is secured also to the arm 236, the arm having a hook 238 thereon and having also a notch 239 in its end. The brace 237 has a spring-clip 240 thereon to temporarily hold the end of a binding-twine to carry the end of the twine about the shock, as will further appear.

An arm 241 is secured rigidly to the guide part 164' and below the hub 177 and has a pivot-head 242 on its end in which is a pivot or hinge-pin 243, the lower side of the pivot-head having a notch 244 therein to receive a latch-bolt. The arm 241 comprises a downward extending member 245 which has its upper end connected to the pivot 243, so that the part may swing slightly toward or from the axis of the guide 164. The arm has guide sheaves 246, 246', suitably mounted thereon near the pivot head. A latch-bar 247 is mounted slidingly in the part 245 and may enter the notch 244 and is forced into the notch by a spring 248 when the arm swings outward to nearly vertical position, the latch-bar 247 having an operating rod 249 connected thereto that is connected also to the guide head 250 mounted in the part 245 and provided with an operating handle 251, whereby to withdraw the latch-bar from the notch and permit the part 245 of the arm to swing inward. A pulley-block 252 is connected with and carried by the lower portion of the part 245 of the arm, the part having a hook 253 on its lower end portion, and also a spring 254 for disconnecting a ring or hook that may be connected to the hook 253. A collar 255 is secured adjustably to the part 245 of the arm by a set-screw 256 and supports a pulley-block 257.

A pair of journal-boxes 258 and 258' are mounted on the legs of the tripod and support a winding-drum 259 provided with a crank arm 260, and also a ratchet wheel 261 that is normally engaged by pawl 262, which is connected by a pivot 263 to an arm 264 mounted to swing horizontally on a pivot 265 supported by a bracket 266, which is secured to the leg 151 of the tripod, so that while the drum normally is prevented from unwinding by the pawl the arm 264 may be forced around in one direction on its pivot to carry the pawl away from the ratchet wheel and permit the drum to unwind, the arm being guided in its proper position above the ratchet-wheel against a flanged collar 267 that is secured to the shaft 259' of the winding-drum. A bracket 268 is secured substantially to the tripod and pivotally supports a bell crank having an upward extending arm 269 and a downward extending arm 270, the former being so arranged as to be pushed upward by the lever 153 when the latter is moved upward pivotally, and the other arm 270 being adapted to engage the arm 264 to swing it for disengaging the pawl from the ratchet-wheel. A compression-rope or cable 271 is connected to the winding-drum 259 and extends over a guide sheave 272 that is supported by the arm 147, the cable extending over a guide sheave 273 mounted on the upper end of the guide part 164'' and thence down through the vertical guide and under a guide sheave 274 mounted on the lower end of the guide part 164', the cable extending thence over the guide sheave 246 and through the pulley-block 252, the end of the cable having a ring 275 attached thereto to be connected to the hook 238 for carrying the cable around the shock, or to be connected to the hook 253 when carried about the shock to serve as a compression-rope when drawn tight by the winding-drum. When placing the ring on the hook 253 the spring 254 yields and the cable is then tightened, so that the spring will not push the ring off of the end of the hook, but acts to push the ring off when the cable is slackened.

A receptacle 276 is mounted on the top of the arm 147 to hold a ball of binding-twine 277 which is drawn from the receptacle through the vertical guide 164 and thence over the guide sheave 246' on the arm 241, and then through the pulley-block 257, and has its end connected to the brace 237 by the clip 240 to be carried thereby about the shock while the latter is being formed, so as to be in readiness for binding the shock with the twine or cord. A platform 278 is built on the main frame adjacent to the rear end of the beam 14 on which the operator or attendant may stand for conveniently operating the various levers or other parts of the machine. The contour of a shock is shown by broken lines indicated by the numeral 279, 280, indicating the band by which the shock is held together.

It should be understood that, as is customary in cutting machines of this character, suitable provision may be made for raising or lowering the frame of the machine on its wheels for adjusting the height of the cutting-knife, which may in some cases be desirable, but inasmuch as such adjusting apparatus is well known and does not form any part of the present invention, is not shown herein.

In the practical operation of the machine it is drawn or propelled with the inclined guides in advance of the cutting apparatus and the corn-stalks are cut off near the ground in a manner well known. The various parts of the shock forming apparatus are arranged substantially as indicated in Fig. 2, so that one section of the turn-table will first be filled with stalks which will be packed between the fingers carried by the arms 179 and 180, and when the section is full the hollow guides in which the packers or feed-belts are mounted will be forced apart by the accumulation of stalks. The hollow guides, as 84 and 84' may, if desirable, be moved farther apart manually or otherwise while the turn-table moves rotatably to bring the next section of the table around to be filled. When the table moves the standard 223, 223', will obviously carry the fingers above the table around also, and each section between two fingers will be filled with stalks in succession until the turn-table is filled and the shock thus built thereon. The arm as 179 will move over the tops of the stalks, and when the stalks are unusually tall the arms may be moved higher so as to clear the stalks by moving the guide 164 upward by means of the cable 172 and the winding-drum 166. The turn-table is put in motion as a result of the operation of the lever 133 and stopped automatically at the proper position by withdrawal of the latch-bar 137 from the arm 131, so that the table may be turned either automatically or independently if the attendant elects that it do so, when in his judgment, a sufficient quantity of stalks has been packed on the turn-table. The lever 133 may be held by hand to prevent the guide 91 from operating it. It will be understood from the foregoing that the standard will carry the ends of the compression-rope and the binding-twine around the shock until the standard arrives at the position of the arm 180 in Fig. 2 when the table will make its final stop. Just before the table stops the brace 233 will engage the disconnector 235, whereby the projection 234 will be disconnected from the turn-table. Then after the shock is built the ring 275 is disconnected from the hook 238 and from the notch 239 and drawn over to the hook 253 to which the ring is connected. The handle 251 is then operated to withdraw the latch-bolt 247 to permit the part 245 of the guide-arm to move inward against the shock, and then the crank-arm 260 is operated to draw the compression-rope tightly about the shock, which is then banded by a part of the binding-twine 277, the twine being then severed after having been tied. The machine is stopped after each shock is built. The shock being completed the lever 103 is operated, so as to lower the turn-table away from the shock and the standard, leaving the shock suspended by the combined guide and supporting fingers. Then the lever 153 is first unlatched and moved around horizontally, so as to carry the shock around rearward of the machine and clear of the turn-table, after which the lever 153 is moved upward pivotally until it strikes the arm 269 which will cause the arm 270 to swing around and release the winding-drum 259 to release the compression-rope, so that the ring 275 will be pushed by the spring 254 from the hook 253. When the lever 153 is moved upward it will move the rod 219 and consequently push the sleeve 202 downward, with the result that the loops 196 will be forced from the projections 191 and permit the shock to fall to the ground, the falling shock acting to force the fingers downward pivotally, and the fingers may further swing downward by forcing down the collar 202, so that the fingers will clear the shock and permit the mast to be turned again to its normal position and again latched. When the lever 153 is again brought to horizontal position it will be apparent that the collar 202 will be moved upward and force the fingers upward pivotally to their normal positions. The turn-table may then be raised to its normal position by the lever 193 and the machine again started and the shocks built and deposited on the ground repeatedly as above described, the arms carrying the fingers, of course, being readjusted and the standard also placed in the position required as at the beginning of operations.

Having thus described the invention, what I claim as new, is—

1. A shock-forming machine including a plurality of rotatably supported bearings adapted for supporting and also rotatably guiding a table, and an annular rotatable table solely supported and rotatably guided at its periphery on the bearings.

2. A shock-forming machine including a turn-table provided with a socket, a hub rotatably supported above the turn-table, arms supported by the hub and having controllable fingers thereon, and a standard secured to one of the arms and removably secured in the socket.

3. A shock-forming machine including a plurality of bearings adapted for supporting and also rotatably guiding a table, one of the bearings being rotatably supported on a stationary axis, the remaining bearings being rotatably supported on vertically adjustable axes, and a table rotatably supported and guided solely at its periphery by the plurality of bearings.

4. A shock-forming machine including an annular table, means for rotatably supporting and guiding and also lowering the table, a standard mounted on the table, and means rotatably mounted above the table independently thereof connected to the standard and provided with controllable fingers to be embedded in the shock for carrying the formed shock away from the table.

5. A shock-forming machine including a frame, a table rotatably supported by the frame, a standard mounted on the table, an arm connected at one end to the standard and extending horizontally above the table, means supported by the frame and pivotally supporting the opposite end portion of the arm on the axis of rotation of the table, and a cord detachably connected with the standard.

6. A shock-forming machine including a main frame, a tilting frame pivotally connected to the main frame, a table rotatably mounted on the tilting frame and provided with a rim having apertures therein, a shaft rotatably mounted on the main frame parallel to the pivotal axis of the tilting frame, a drive-wheel on the shaft having teeth entering the apertures, and means for supporting the tilting frame in different planes.

7. A shock-forming machine including a rotatable table, a vertical hollow guide supported above the table, a hub rotatably mounted on the guide and having radially extending arms thereon provided on their ends with hinged and controllable inwardly extending fingers, a standard connected with one of the arms and detachably connected with the table, a guide-arm secured to the hollow guide and having guide-sheaves thereon, and a compression-rope and also a binding twine extending through the guide and over the guide-sheaves and connected to the standard.

8. A shock-forming machine including a main frame, a drop-frame movably supported on the main frame, an annular table rotatably mounted on the drop-frame, a rotatable mast mounted on the main frame and having an arm movable above the table, a rotatable and vertically adjustable hub supported by the arm of the mast, arms radially mounted on the hub and extending downward, each arm having a finger pivoted thereto, means for controlling the fingers, and means adjustably connected with the hub and detachably connected with the table for rotating the hub.

9. A shock-forming machine including a main frame, a drop-frame movably supported on the main frame, an annular table rotatably mounted on the drop-frame, there being clear space above the opening in the table, a rotatable mast mounted on the main frame and having an arm movable above the table, a hub rotatably supported by the arm of the mast, arms radially mounted on the hub and having downwardly extending portions, fingers pivoted to the said portions of the arms, means for controlling the fingers, and means operatively connected with the hub and detachably connected with the table for rotating the hub.

10. A shock-forming machine including a frame, a table rotatably mounted on the frame, a mast mounted on the frame and having an arm thereon, a finger pivotally supported above the plane of the table by means of the arm and provided with a latch for normally holding the finger horizontally toward the axis of rotation of the table, and movable means supported by the arm for retracting the latch.

11. A corn shocker including a frame, a turn-table mounted on the frame, a rotatable mast mounted on the frame and having an arm extending above the turn-table, a vertical guide mounted on the arm, arms mounted rotatably on the guide and extending outward and downward therefrom above the turn-table, each arm having a finger pivoted thereto, means for holding the fingers when moved pivotally to approximately horizontal positions, and means for rotating the mast.

12. A shock-forming machine including a frame, a table rotatably mounted on the frame, a mast mounted on the frame and having an arm provided with a guide movable above the table, a hub rotatably supported by the guide, arms mounted on the hub and provided with pivoted controllable fingers, means for controlling the fingers, a guide-arm carried substantially by the guide and having a hinged member extending downwardly, means for controlling said member, a pully-block and also a cast-off hook mounted on said member, and a cable extending over the pulley-block and having a ring for engagement with the cast-off hook.

13. A corn-shocker including a frame, a turn-table mounted on the frame, means for rotating the turn-table, means for lowering the turn-table to an inclined position, a rotatable mast mounted on the frame and having an arm thereon, a vertical guide mounted on the arm, combined guide and supporting fingers supported by the vertical guide to move about the axis thereof, means mounted removably on the turn-table for moving the fingers, and means for rotating the mast.

14. A shock-forming machine including a frame, a table rotatable on the frame and provided with a socket, a hub having arms thereon and supported by means of the frame above the turn-table to rotate about the axis thereof, the arms having fingers thereon extending toward the axis, the fingers being movably mounted on the arms and adapted to be moved outward from the axis, a standard connected with one of the arms and seated removably in the socket and having a brace latched to the turn-table, a disconnector mounted on the frame to unlatch the brace on rotation of the turn-table, and means for lowering the turn-table.

15. A corn-shocker including a frame, wheels carrying the frame, a shaft mounted horizontally on the frame and connected with one of the wheels to be rotated thereby, cutting apparatus connected with the shaft, two inclined guides on the frame, two vertical shafts on the frame and connected with the horizontal shaft, two horizontal guides pivoted to the vertical shafts, feed-belts in the horizontal guides and connected with the vertical shafts, feed-belts on the inclined guides and connected with the vertical shafts, a turn-table on the frame, and a drive-wheel on one of the vertical shafts and engaging the turn-table.

16. In a cutting and shocking machine, the combination with cutting mechanism, a shock-former, inclined feed-belts in a plane above the cutting mechanism, substantially horizontal feed-belts to receive from the inclined feed-belts and deliver to the shock-former, and rotatable shafts for driving the feed-belts, of toothed wheels secured to the shafts, annular belt-wheels having their axes inclined obliquely to the axes of the shafts and driven by the toothed wheels, the belt-wheels driving the inclined feed-belts, and means connecting the horizontal feed-belts with the shafts.

17. A corn shocker including a frame, a table rotatable on the frame, a plurality of guide fingers suitably supported above the table to move about the axis thereof and also to move pivotally in vertical planes, means for normally holding the fingers in approximately horizontal positions with their ends near to the axis of the table, means between the table and the fingers for moving the fingers about the axis of the table on rotation of the table, and means for releasing the holding means to permit the fingers to move pivotally in vertical planes.

18. A shock-forming machine including a frame, a table rotatable on the frame, a mast mounted on the frame and having an arm thereon, a finger or spur supported by the arm above the plane of the table to move pivotally in a vertical plane, means for normally holding the finger in approximately horizontal position with its end toward the axis of rotation of the table, means for releasing the holding means to permit pivotal movement of the finger, a standard mounted on the table, a compression-rope detachably connected with the standard, and a pulley supported by the arm to guide the rope.

19. A corn-shocker including a main frame having a vertical guide-roller mounted thereon that is provided with a crowning bearing flange, a drop-frame hinged to the main frame and having a plurality of vertical guide-rollers mounted thereon that are each provided with a bearing flange, a circular turn-table mounted between the guide-rollers and supported on the flanges thereof, the turn-table being adapted to be engaged by a gear-wheel, a shaft mounted rotatably on the main frame, a gear-wheel on the shaft and engaging the turn-table, and means for normally supporting the free end of the drop-frame by means of the main frame.

20. A corn shocker including a frame, a turn-table mounted on the frame, a mast having an arm and mounted on the frame, a vertical guide mounted on the arm of the mast, a hub mounted on the guide to rotate about the axis of the turn-table, arms secured to the hub and extending radially therefrom and comprising each a downward-extending part having a finger pivoted thereto, each finger being provided with a latch normally holding the finger in an approximately horizontal position, the fingers extending toward the axis of the turn-table, means connected with the arms for moving the fingers to horizontal positions, and means connected with the arms for releasing the latches.

21. A corn-shocker including a main frame, a pair of longitudinal beams pivoted on the main frame, a transverse beam attached to the longitudinal beams, means for supporting the transverse beam and moving it vertically, a bearing device mounted on the main frame, two bearing devices mounted on the longitudinal beams, one on each beam, a turn-table mounted on the bearing devices on which to form a shock, a shaft rotatable on the main frame, a drive-wheel on the shaft engaging the turn-table, and means for supporting the shock when the turn-table descends on downward vertical movement of the transverse beam.

22. A corn-shocker including a frame, a turn-table mounted to rotate on the frame and having a plurality of latch-retracting devices on the under side thereof, a shaft rotatable on the frame, a drive-wheel mounted loosely on the shaft and engaging the turn-table to rotate it, a clutch on the shaft and movable to connect the drive-wheel to the shaft to be rotated thereby, an arm for operating the clutch, and a latch-bar spring-pressed into engagement with the arm after operation of the clutch and adapted to be engaged by the latch-retracting devices to release the arm and permit the clutch to release the drive-wheel.

23. A corn cutter and shocker including a frame, wheels carrying the frame, cutting apparatus mounted on the frame, guides on the frame leading to the cutting apparatus, a turn-table mounted on the frame on which to form a shock, a rotatable mast mounted on the frame for carrying the shock from the turn-table, a coupling pole or beam attached to and forming a side part of the frame and extending forward and upwardly approximately as far as the ends of the guides and having a pivot-iron on its end, a brace secured to the end portion of the pole and to the frame adjacent to one of the guides, an axle having pivotal connection with the pivot-iron, the axle having a jaw rigid thereon that has a horizontal pivot therein, a pair of flanged guide-wheels on the axle, and a pole connected to the horizontal pivot.

24. Stalk-feeding mechanism including two opposing inclined feed-guides having each an annular belt-wheel mounted rotatably thereon, each belt-wheel having gear teeth on one side thereof, guide-wheels on the inclined guides, two rotatable vertical driving shafts extending through the belt-wheels, one in each belt-wheel, obliquely to the axis thereof and having each a toothed wheel thereon coöperating with the gear teeth of one of the belt-wheels, feed-belts each connected with one of the belt-wheels and one of the guide-wheels, and two feed-guides pivotally supported on the shafts, one on each shaft to swing in a sbstantially horizontal plane, and feed-belts mounted in the pivotally supported feed-guides and driven by the shafts.

25. A corn-shocker including a main frame, guide-sheaves mounted on the frame, cables extending over the guide-sheaves, a transverse beam supported movably by the cables, a pair of longitudinal beams pivoted to the main frame and secured to the transverse beam and having each a roller-bearing thereon, a roller-bearing mounted on the main frame, a turn-table mounted on the roller-bearings on which to form a shock, means connected to the cables for holding them or drawing them to lift the transverse beam, means for supporting the shock when the table is lowered by downward movement of the transverse beam, a shaft rotatable on the main frame, and a drive-wheel on the shaft engaging the turn-table.

26. A corn shocker including a frame, a turn-table mounted on the frame, a mast having an arm and mounted on the frame, a hollow vertical guide mounted on the arm of the mast and having a guide-pulley on the upper end and also a guide-pulley on the lower end thereof, a guide-arm secured to the lower end portion of the vertical guide and extending horizontally outward therefrom, the guide-arm having a downward-extending part hinged thereto and provided with a latch, a guide-pulley on the upper portion and also a guide-pulley on the lower portion of the guide-arm, means for holding a shock upright on the turn-table, and a rope or cord extending through the hollow vertical guide and in contact with all the guide-pulleys to embrace the shock.

27. A shock-forming machine including a turn-table, means for supporting and lowering the turn-table, a hub having arms thereon and supported above the turn-table to rotate about the axis of the turn-table, the arms having fingers hinged thereto and provided with latches to hold the fingers normally in positions extending toward the axis, means for moving the fingers to normal positions, means for operating the latches to release the fingers, a standard connected with one of the arms and detachably connected with the turn-table, a compression-rope extending through the hub and connected to the standard, a guide for the compression-rope between the hub and the standard, and means for moving the hub away from above the turn-table.

28. A shock-forming machine including a frame, means for raising or lowering the frame, a turn-table mounted on the frame and provided with a pair of sockets on the top thereof, a hub having arms thereon and supported by means of the frame above the turn-table to rotate about the axis thereof, the arms having fingers thereon extending toward the axis and adapted to be moved outward therefrom, a frame bar secured to one of the arms and extending downward therefrom and having guides thereon, a pair of rods connected together and forming a standard, the rods being movable upward in the guides and the lower ends of the rods seated removably in the sockets, and means for moving the hub and arms and also the standard laterally from above the turn-table when the frame with the turn-table is lowered.

29. A corn-stalk shocker including a frame, a turn-table mounted to rotate on the frame, a mast mounted to rotate on the frame and having an arm provided with a hollow vertical guide having a guide-arm secured fixedly thereto, guide-pulleys on the guide-arm, combined guiding and supporting fingers supported by the vertical guide above the guide-arm to move about and also outward from the axis of the vertical guide, a standard mounted removably on the turn-table and connected with one of the fingers whereby to move the fingers about the axis of the vertical guide, a compression-rope extending through the hollow vertical guide and the guide-pulleys and connected with the standard, a winding drum for tightening the compression-rope, means for rotating the mast, and means for moving the fingers outward from the axis of the vertical guide.

30. A corn-stalk shocker including a frame, a turn-table mounted on the frame to be rotated or to be inclined, means for rotating the turn-table, means for inclining the turn-table, a rotatable mast mounted on the frame and having an arm thereon, a hollow vertical guide mounted on the arm, combined guiding and supporting fingers supported by the vertical guide to move about and also outward from the axis thereof, means for packing corn-stalks between the fingers on the turn-table, means for moving the fingers in unison with the rotation of the turn-table, a guide-arm secured to the vertical guide and having guide-pulleys thereon, a compression-rope extending through the hollow vertical guide and also through the guide-pulleys, a winding-drum for tightening the compression-rope, means for rotating the mast, and means for moving the fingers outward from the axis of the vertical guide.

31. In a cutting and shock-forming machine, the combination with a movable main frame, cutting apparatus mounted on the main frame, and a turn-table, of a movable frame pivoted at one end thereof to the main frame and at the free end thereof having bearing devices on which the turn-table has bearings for support, controlling means mounted on one side of the main frame for holding or moving the movable frame, and connecting means connected with the controlling means and also with the free end of the movable frame, part of the connecting means extending across to the opposite side of the main frame.

32. In a cutting and shock-forming machine, the combination with a movable main frame, cutting apparatus mounted on the main frame, and a driving shaft mounted on the main frame, of a movable frame pivoted at one end thereof to the main frame in proximity to the driving shaft and having a plurality of rotative bearings thereon, means for supporting or raising or lowering the free end of the movable frame, a rotative bearing on the main frame, a toothed wheel on the driving shaft, and a table mounted rotatably on the rotative bearings and having openings in the periphery thereof receiving the teeth of the toothed wheel.

33. In a stalk-cutting and shock-forming machine, the combination with a movable frame, cutting apparatus mounted on the frame, a turn-table mounted on the frame, a mast rotatable on the frame and having an arm thereon provided with a vertical guide, of arms mounted on the vertical guide provided with hinged fingers serving to guide the stalks to sections of the turn-table and serving also to support and carry the stalks between them, means for moving the arms about the axis of the guide on turning of the turn-table, latches for the hinged fingers, means for operating the latches, and a binder for the stalks.

34. In a stalk-cutting and shock-forming machine, the combination with a movable frame, cutting apparatus on the frame, a table rotative on the frame, and a mast having an arm and rotative on the frame, of a guide mounted vertically on the arm of the mast, a hub supported rotatably on the guide, arms attached to the hub and having fingers hinged thereto, a sleeve movable vertically on the guide, latches for the fingers and having operating connections in connection with the sleeve, the operating connections serving to move the fingers on their hinges, and means for holding or moving the sleeve.

35. In a stalk-cutting and shock-forming machine, the combination with a movable frame, cutting apparatus on the frame, a table rotative on the frame, and a mast having an arm and rotative on the frame, of a guide movable vertically on the arm of the mast, a guide-sheave on the arm, a winding-drum on the mast, a cable connected to the winding-drum and extending over the guide-sheave to the guide and secured thereto, a hub supported rotatably on the guide, arms attached to the hub and having fingers hinged thereto, a bracket attached to the guide, a sleeve movable vertically on the guide, latches for the fingers, operating devices connected with the fingers and the sleeve, the devices being adapted to unlatch the latches, and a lever pivoted to the bracket and engaging the sleeve for control thereof.

36. In a shock-forming machine, the combination with a movable frame, cutting apparatus on the frame, a horizontal driving shaft on the frame connected with the cutting apparatus, two vertical feed-belt shafts on the frame and connected with the driving-shaft, and feed-belts connected with the feed-belt shafts, of a toothed wheel loose on one of the vertical shafts, a clutch for locking the toothed wheel to the vertical shaft, a latch for holding the clutch in operative position, a turn-table mounted to rotate on the frame and having openings in the periphery thereof receiving the teeth of the toothed wheel, and a plurality of devices on the turn-table for retracting the latch.

37. In a machine, the combination with a vertical guide, and a movable carrier for the guide, of a hub mounted on the guide, a plurality of supporting arms secured to the hub and having each a pivot near its end, a plurality of fingers, one for each arm, each finger having a relatively short arm connected to the pivot on its respective arm, each finger arm having a latch-lever pivoted thereto and provided with a loop to engage the end of the supporting arm to which it is pivoted for holding the finger in substantially horizontal normal position, a spring connected to the latch-lever for projecting the loop, a plurality of operating levers pivoted on the supporting arms, a lever on each arm, a plurality of connecting rods each pivoted to one of the operating-levers and connected loosely to one of the fingers and having a device thereon to engage the latch-lever for retracting the loop, the connecting-rods serving to move the fingers to normal positions, a sleeve mounted on the guide to move vertically thereon and having operative connection with the operating levers, and means for controlling or holding the sleeve.

38. In a machine, the combination with a support, of a guide mounted vertically on the support and having a bracket thereon, a hub mounted on the guide, arms secured radially on the hub, operating-levers pivoted on the arms, fingers pivoted to the arms, latches on the fingers to engage the arms, connecting-rods pivoted to the operating-levers and connected to the fingers for retracting the latches and moving the fingers pivotally, a sleeve movable vertically on the guide and having connection with the operating-levers, the sleeve having a flange thereon, a sleeve-operating lever pivoted to the bracket and having two links pivoted thereto, and a bar pivotally connected to the links and having two arms provided with projections engaging the flange of the sleeve.

39. In a shock-forming machine, the combination with a movable frame, a table mounted on the frame, a mast rotatable on the frame, an arm on the mast normally extending above the table, and a guide-head and also a guide-sheave on the arm, of a guide movable vertically in the guide-head and having a two-flange channel-iron attached thereto that extends through the guide-head, a cable extending over the guide-sheave and through the guide-head between the flanges of the channel-iron to the lower portion of the guide and secured thereto, and shock-supporting and carrying means mounted on the lower end portion of the guide.

40. In a shock-forming machine, the combination with a movable frame, a table rotative on the frame, a mast rotative on the frame, and an arm on the mast extending above the table and having a guide-head thereon, of a guide mounted vertically in the guide-head and having a collar secured to the lower portion thereof, bearing-balls on the collar, a hub extending about the collar and having an in-turned flange extending over the bearing-balls for support, a plurality of supporting devices mounted on the hub, a guide-arm secured fixedly to the guide below the hub and having an arm-part hinged thereto, a latch for holding the arm-part against movement on its hinge, a guide-sheave and also a hook mounted on the arm-part, a standard connected to one of the supporting devices and also connected detachably to the table, means for lowering the table away from the standard, a compression-rope extending through the guide-sheave and adapted to be connected to the standard or to the hook on the arm-part, a winding-drum for tightening the compression-rope, and guides for the compression-rope.

41. In a shock-forming machine, the combination with a movable frame, a table on the frame on which to form a shock, and a mast rotative on the frame, of an operating lever pivoted to the mast, a latch for the operating lever mounted on the frame, shock-supporting and carrying apparatus supported by the mast and operative to release the shock, a lever pivotally supported horizontally by the mast for operating the shock-supporting and carrying apparatus to release the shock and having a rod connected thereto that is connected also to the operating lever, and means for lowering the table.

42. In a shock-forming machine, the combination with a movable frame, a table on the frame on which to form a shock, a mast mounted on the frame, and a winding-drum mounted on the frame and provided with a ratchet-wheel, of an operating lever pivoted to the mast, a latch for the lever mounted on the frame, shock-supporting apparatus supported by the mast and operative to release the shock, means for operating the shock-supporting apparatus to release the shock, a compression-rope to encircle and compress the shock and connected to the winding-drum, guides for the compression-rope, an arm pivotally mounted on the frame and having a pawl mounted thereon that normally engages the ratchet-wheel, and a trip device mounted on the frame to be engaged by the operating-lever and adapted to move the arm to carry the pawl away from the ratchet-wheel to slacken the compression-rope.

43. In a shock-forming machine, the combination with a movable frame, a table rotatable on the frame on which to form a shock, a mast rotatably mounted on the frame, and a twine-holder supported by the mast, of a vertical guide supported by the mast, shock-supporting and carrying apparatus supported by the guide, a guide-arm secured fixedly to the vertical guide and comprising a horizontal part and a depending part hinged to the horizontal part, guide-sheaves on the guide-arm, binding twine extending from the twine-holder in contact with the guide-sheaves, and means connected with the table and the said apparatus for carrying the twine about the shock on the table.

44. In a corn cutting and shocking machine, the combination with a frame, a cutting knife mounted on the frame, a table mounted on the frame, and inclined guides on the frame leading to the cutting knife, of vertical shafts mounted rotatably on the frame, feed-belts on the inclined guides and connected with the vertical shafts, packers comprising opposing horizontal guides swinging on the vertical shafts to guide from the inclined guides to the table and feed-belts connected with the vertical shafts and guided by the horizontal guides, and springs normally forcing the opposing horizontal guides to swing each toward the other.

45. In a corn-cutting and shocking machine, the combination with a frame, cutting apparatus mounted on the frame, and a turn-table mounted also on the frame, of a drive shaft rotatably mounted horizontally on the frame, two opposing inclined feed guides mounted on the frame and having each an annular belt-wheel rotatably mounted thereon, each belt-wheel having gear teeth on one side thereof, guide-wheels on the inclined guides, two rotatable vertical shafts geared to the drive shaft and extending through the belt-wheels, one in each belt-wheel, obliquely to the axis thereof and having each a toothed wheel thereon coöperating with the gear teeth of one of the belt-wheels, gearing connecting the turn-table with one of the vertical shafts, and feed-belts each connected with one of the belt-wheels and one of the guide-wheels.

46. In a shock-forming machine, the combination with a frame, a table rotatable on the frame on which to form a shock, and a mast rotatable on the frame and having a vertical guide-head thereon, of a hollow guide mounted to move vertically in the guide head and having guide-sheaves at the upper and lower ends thereof, means for moving or holding the guide, a hub rotatable on the hollow guide, arms attached to the hub, a guide-arm secured fixedly to the hollow guide below the hub and having guide-sheaves thereon, a compression-rope and also a binding-twine extending through the hollow guide in contact with the guide-sheaves thereof and also in contact with the guide-sheaves of the guide-arms, means for rotating the hub on rotation of the table, means for carrying the compression-rope and the twine partially about the shock on the table, means for connecting the compression-rope to the guide-arm, and means for drawing the compression-rope taut.

47. In a shock-forming machine, the combination with a frame, of a table rotatable on the frame and having sockets thereon, a mast rotatable on the frame, a vertically-arranged guide supported by the mast, shock-supporting arms having a hub rotatable on the guide above the table, one of the arms having a vertical frame-bar thereon provided with guides, a pair of connected rods extending movably through the guides and into the sockets removably, means for limiting downward movement of the rods relatively to the frame-bar, and means for increasing the space between the shock-supporting arms and the table for withdrawing the rods from the sockets and permitting the arms to support the shock.

48. In a shock-forming machine, the combination of a turn-table rotatably supported, a hub rotatably supported above the turn-table, arms secured to the hub and extending radially and downwardly, fingers hinged to the arms, and means for controlling the fingers, with means for rotating the turn-table, and means for rotating the hub in unison with the rotation of the turn-table.

49. In a shock-forming machine, the combination with a frame, a table, means mounted on the frame for rotatably supporting and lowering the table, and a mast mounted on the frame, of a standard mounted on the table, means supported by the mast for supporting a shock on lowering of the table, and a compression-rope guided on the mast and detachably connected with the standard.

50. In a shock-forming machine, the combination of a turn-table rotatably supported, a mast having an arm thereon and rotatably supported, a vertical guide movably supported by the arm, and a hub rotative on the guide and having radially-arranged and downwardly extending arms thereon, each arm having a finger pivoted to its end portion and normally extending toward the axis of the turn-table, with means for rotating the turn-table, means for rotating the hub on rotation of the turn-table, and means for controlling the fingers.

51. In a shock-forming machine, the combination with a turn-table rotatably supported, means for rotating the turn-table, a guide normally supported movably above the turn-table, and means for moving the guide away from its normal position, of a hub mounted rotatably on the guide and having radially-arranged arms thereon, fingers movable on the arms, means for controlling the fingers, and detachable means connected with the turn-table and one of the arms for rotating the hub to move the fingers with the turn-table.

52. In a shock-forming machine, the combination of a turn-table, means for rotatively supporting and lowering the turn-table, a hub, means for normally supporting the hub rotatively above the turn-table and carrying it away from its normal position, arms provided with movable fingers and mounted on the hub, means for controlling the fingers to carry or release a shock, and means for rotating the hub, with means for rotating the turn-table, a compression-cord, means for carrying the compression-cord about the axis of the turn-table to embrace a shock, and means for tightening the compression-cord about the shock.

53. In a shock-forming machine, the combination with a turn-table, a guide supported above the turn-table and movable therefrom, and a hub rotatably supported by the guide, of a plurality of arms supported radially on the hub and having each a projection thereon, a plurality of fingers, one for each arm, each having a lateral arm provided with a jaw that is pivoted to the radial arm, a latch pivoted to the jaw and having a loop adapted to engage the projection, a spring for holding the loop in engagement with the projection, and a rod connected to the finger for moving it pivotally to be latched and acting to operate the latch to release the finger.

54. In a shock-forming machine, the combination with a turn-table, a vertical guide supported above the turn-table and removable therefrom, a hub rotatably supported by the guide, and a plurality of radially-arranged arms carried by the hub, each arm having a finger mounted movably thereon, of a guide-arm mounted fixedly on the vertical guide below the hub and having a guide-sheave thereon, a pulley mounted on the guide-arm, a cast-off device mounted on the guide-arm, a cable extending about the guide-sheave and the pulley, means for drawing the cable about the axis of the hub to be connected to the cast-off device, and means for tightening the cable when connected to the device.

55. In a shock-forming machine, the combination with a turn-table, a vertical guide supported above the turn-table and removable therefrom, a hub rotatably supported by the guide, and a plurality of radially-arranged arms carried by the hub, each arm including a movable finger, of a guide-arm mounted fixedly on the vertical guide below the hub and comprising a horizontal part having a pivot-head thereon that is provided with a notch, a downward-extending member pivoted to the pivot-head and having a latch-bar thereon that is normally spring-pressed into the notch, means for connecting a cable with the said member to form a loop about the axis of the hub, means for retracting the latch-bar from the notch, and means for tightening the cable to compress the shock when formed.

56. In a shock-forming machine, the combination of a turn-table on which to form a shock, means for rotating the turn-table, a plurality of arms supported above the turn-table to move about a vertical axis, and guiding means mounted above the turn-table for guiding a cable, with connecting means removably attached to the turn-table for moving the plurality of arms therewith, a cable guided by the guiding means, and means for detachably connecting the cable to the connecting means to draw the cable about the shock on the turn-table.

57. In a shock-forming machine, the combination of a frame, a table, and means mounted on the frame for rotatably supporting and lowering the table, with a standard mounted on the table, a mast mounted on the frame and having an arm, means mounted on the arm for supporting a shock on lowering of the table, a cord and also a rope detachably connected with the standard, and means for guiding the cord and the rope on rotation of the table.

58. In a shock-forming machine, the combination with a frame, and rotatable bearings mounted on the frame, of a table arranged on a plane above the frame, and comprising an annular plate conically formed, a ring secured to the outer edge portion of the plate and extending upward above the plane of the plate and also under the plate and supported and guided on the rotatable bearings, and a ring secured to the inner edge portion of the plate and extending upward above the plane of the plate.

59. In a shock-forming machine, the combination with a frame, a table rotatable on the frame, a mast having an arm and mounted on the frame, a standard mounted on the table, and a winding drum suitably supported, of a compression rope guided on the arm of the mast and connected with the winding drum and also detachably connected with the standard.

60. In a shock-forming machine, the combination with a main frame, of a tilting frame pivotally connected to the main frame, a table rotatably mounted on the tilting frame and provided with a rim adapted to be acted on for rotating the table, and actuating means supported on the main frame and having operative connection with the rim for rotating the table.

61. In a shock-forming machine, the combination with a main frame, and actuating means supported on the main frame, of a tilting frame pivotally connected to the main frame, a bearing rotatably supported on the main frame, a plurality of bearings rotatably supported on the tilting frame, and a conical table having a central opening and rotatably supported and guided at its periphery on all the bearings, the table having a rim on its periphery operatively connected with the actuating means for rotating the table.

In testimony whereof, I affix my signature in presence of two witnesses.

ARTEMUS N. HADLEY.

Witnesses:
P. A. HARELICK,
E. T. SILVIUS.

Copies of this patent may be obtained for five cents each, by addressing the "Commissioner of Patents, Washington, D. C."